No. 739,835. Patented September 29, 1903.

UNITED STATES PATENT OFFICE.

MATHILDE CORDES, GEBOREN MÜLLER, OF HANOVER, GERMANY.

ART OF MAKING ARTIFICIAL STONE.

SPECIFICATION forming part of Letters Patent No. 739,835, dated September 29, 1903.

Application filed October 1, 1902. Serial No. 125,595. (No specimens.)

*To all whom it may concern:*

Be it known that I, MATHILDE CORDES, née MÜLLER, lady, a subject of the Emperor of Germany, residing at 16 Scheffelstrasse, Hanover, Germany, have invented certain new and useful Improvements in the Art of Making Artificial Stone, of which the following is a specification.

The present invention relates to the art of manufacturing artificial stone, the purpose being to render the resultant stone extremely light, durable, and particularly hard and at the same time inexpensive in its manufacture. The stones can be produced of any shape and dimensions and are preferably adapted for use in erecting light partitions or dividing-walls of any kind.

It is known that light stones may be obtained by adding peat, peat-rubble, tan, ashes, &c., to a solution of gypsum in water, introducing the resultant mixture, which is of pulpy consistence, into suitable forms or molds and then drying the stones in the forms or molds. Such stones, however, are not durable and of the required hardness. My invention is designed to overcome these objections, and it resides principally in the employment as a filling material of peat in the form of comminuted peat or peat-rubble when combined with a material of greater specific gravity, also in comminuted form, which has the property of attaching itself to the peat, thereby preventing the latter from rising and distributing itself unevenly in the liquid mass into which it is introduced. This property has been found by me to exist in an eminent degree in ashes and also in comminuted or pulverulent coke, which for this purpose is an equivalent of the ashes.

My invention also resides in the employment of shavings, such as are formed in the usual wood-planing machines, which shavings serve to anchor or tenaciously support the ingredients of the factitious stone. Comminuted peat thus combined with the ashes or its equivalent is under my invention added to a liquid or semiliquid mixture of water, hydraulic lime (calcareous cement) and barium hydrate or carbonate, ($BaOH_2$ or $BaCO_3$,) and gypsum, and it will be found that the same will become evenly distributed throughout the mixture. The shavings from the wood-planing machine are preferably added at the same time with the peat and ashes or equivalent. These shavings, being curled up, form tubular recesses into which the plastic mass enters.

My invention also consists in the artificial stone resulting from the new process and in such other features and methods as will be hereinafter described, and pointed out in the claims.

The following will serve as an example embodying the preferred manner of carrying out my invention.

In order to manufacture about twenty-five hollow stones of twenty-five centimeters length by twelve centimeters width by ten centimeters in thickness, I mix one kilogram of hydraulic lime (calcareous cement) and one kilogram of hydrate or carbonate of barium with forty-five kilograms of water and dissolve the whole by stirring. I then add to the above liquid mixture fifteen kilograms of gypsum, two kilograms of comminuted peat (peat-rubble,) and twelve and one-half kilograms of ashes. One and one-half kilograms of wood shavings from a planing-machine are either added with the peat and ashes or thereafter. The wood shavings absorb very little moisture and unite firmly with the mass after it has set. Since they extend in all directions throughout the mass and since the mass enters into the tubular spaces formed by the curled-up shavings, they form a very effective anchoring medium for said mass. The mixture is then preferably continuously stirred until it is introduced into the molds. This mixture is of a thin pulpy consistence. After it has been poured into the molds it is submitted to a drying process while in the molds, said drying process being either carried out by artificial means or being merely an air-drying process. As soon as the mass has completely set the artificial stones are removed from the molds or forms and piled up for further drying. The weight of a dried stone made as above is about one and one-half kilograms.

Artificial stones made according to this process by reason of their homogeneous mass are capable of being molded with perfectly smooth surfaces and sharp edges and may be readily dressed, chiseled, and sawed. They are weatherproof and while light are at the same time very strong. In view of cheapness of the raw materials employed and the simplicity of their manufacture their cost is relatively low.

Instead of the peat-rubble tan may be employed and is to be regarded as an equivalent of the peat, since it also will combine with ashes or pulverulent coke in such a way as to prevent its rising to the top and to insure an even distribution of the same throughout the mass.

Having thus fully described my invention, what I claim as new, and desire to secure by Letters Patent of the United States, is—

1. The process of making artificial stone, which consists in adding to an aqueous lime and barium mixture comminuted peat combined with a comminuted substance of greater specific gravity which has the property of attaching itself to the peat particles.

2. The process of making artificial stone, which consists in adding to an aqueous lime and barium mixture comminuted peat combined with a comminuted substance of greater specific gravity which has the property of attaching itself to the peat particles, and also adding wood shavings to such mixture.

3. The process of making artificial stone, which consists in mixing hydraulic lime and barium hydrate or carbonate with water, and then adding to the mixture so formed gypsum and comminuted peat combined with a pulverulent material of higher specific gravity than peat, which will attach itself to the particles of the peat.

4. The process of making artificial stone, which consists in mixing hydraulic lime and barium hydrate or carbonate with water, and then adding to the mixture so formed gypsum and comminuted peat combined with a pulverulent material of higher specific gravity than peat, which will attach itself to the particles of the peat, and wood shavings.

5. The process of making artificial stone, which consists in dissolving hydraulic lime and barium hydrate or carbonate with water, and then adding to the solution so formed gypsum and comminuted peat combined with a pulverulent material of higher specific gravity than peat, which will attach itself to the particles of the peat.

6. The process of making artificial stone, which consists in dissolving hydraulic lime and barium hydrate or carbonate with water, and then adding to the solution so formed gypsum and comminuted peat combined with a pulverulent material of higher specific gravity than peat, which will attach itself to the particles of the peat, and wood shavings.

7. The process of making artificial stone, which consists in mixing hydraulic lime and barium hydrate or carbonate with water, and then adding to the mixture so formed gypsum and comminuted peat combined with a pulverulent material of higher specific gravity than peat, which will attach itself to the particles of the peat, then molding, and drying the same.

8. The process of making artificial stone, which consists in mixing hydraulic lime and barium hydrate or carbonate with water, and then adding to the mixture so formed gypsum and comminuted peat combined with a pulverulent material of higher specific gravity than peat, which will attach itself to the particles of the peat, and wood shavings, then molding, and drying the same.

9. A composition for artificial stones, &c., consisting in a mixture of barium and lime compounds with comminuted peat combined with a comminuted material having greater specific gravity than the peat, and which attaches itself to the peat particles.

10. A composition for artificial stones, &c., consisting in a mixture of barium and lime compounds with comminuted peat combined with a comminuted material having greater specific gravity than the peat, and which attaches itself to the peat particles, and wood shavings.

11. A composition for artificial stone, which consists in a mixture of barium hydrate or carbonate, hydraulic lime and gypsum with comminuted peat combined with ashes.

12. A composition for artificial stone which consists in a mixture of barium hydrate or carbonate, hydraulic lime and gypsum with comminuted peat combined with ashes and wood shavings.

Signed by me at Hanover this 17th day of September, 1902.

MATHILDE CORDES, G. B. MÜLLER.

Witnesses:
  ADOLF CORDES,
  LEONORE RASCH.